July 6, 1954
C. NISBET ET AL
2,682,728
APPARATUS FOR SUBJECTING COTTON PLANTS
AND THE LIKE TO HOT GASES
Filed March 17, 1950
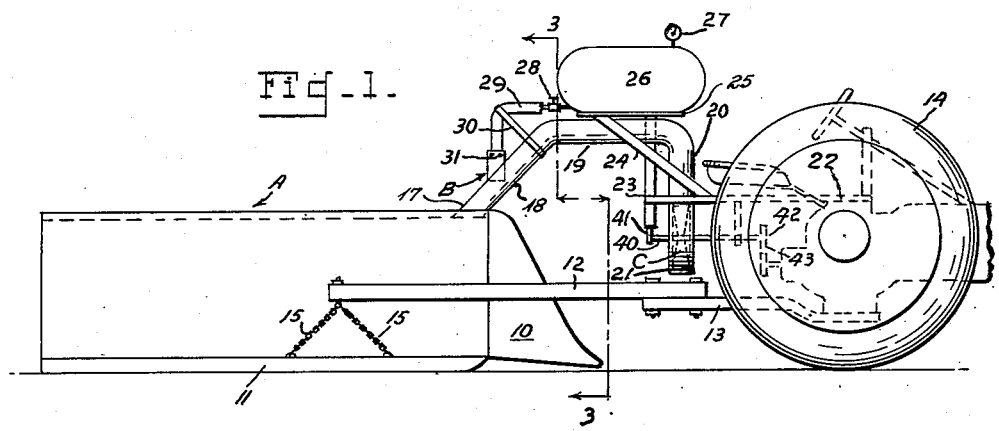
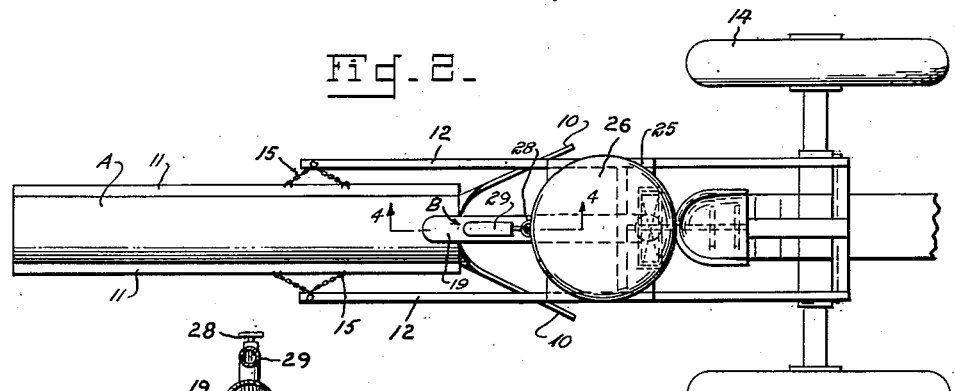
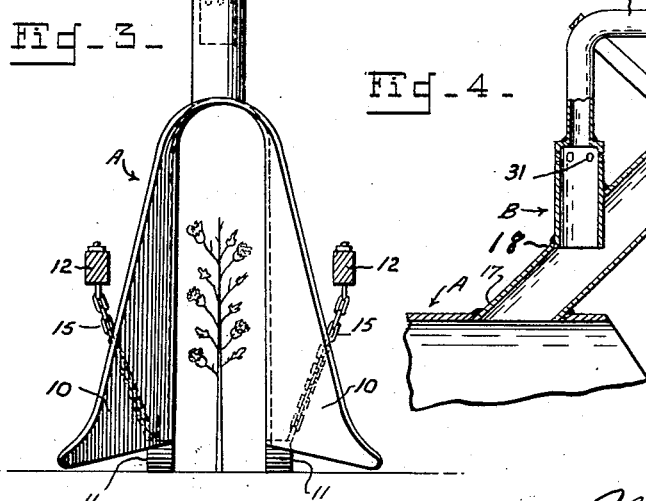
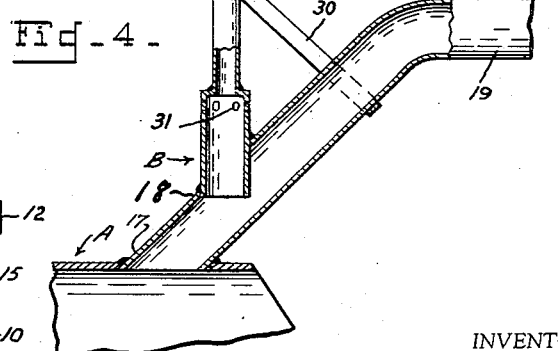
INVENTORS.
Calvin Nisbet,
Carl S. Nisbet, Jr,
ATTORNEY Patented July 6, 1954

2,682,728

UNITED STATES PATENT OFFICE 2,682,728

APPARATUS FOR SUBJECTING COTTON PLANTS AND THE LIKE TO HOT GASES

Calvin Nisbet and Carl S. Nisbet, Jr., San Angelo, Tex.

Application March 17, 1950, Serial No. 150,274

5 Claims. (Cl. 47—1)

The invention relates to apparatus for subjecting cotton plants and the like to hot gases, and is particularly intended for defoliating cotton plants prior to picking with a mechanical picker.

Leaves on the cotton stalk are a handicap to the harvesting of cotton, and are objectionable from at least three standpoints. First, the leaves present a surface barrier which hampers the picking means from reaching all the cotton. Secondly, juice from the leaves mashed or cut by the picking mechanism stains the cotton and lowers the grade of the picked sample. Third, accumulations of leaf juice gum up the mechanical parts, interfering with their functioning, and these juice accumulations are difficult to remove. Furthermore, plants with heavy foliage are susceptible to boll rot because of lack of sunshine on the lower branches.

Owing to the present high cost of labor and the competitive position of cotton with reference to other fibers used in the textile industry the use of mechanical pickers has become more and more an economical necessity. Various forms of mechanical pickers have been designed, some of which perform excellent work when the cotton is in the proper condition for such picking.

However, it has been found that the presence of foliage, particularly green foliage, at the time of picking materially reduces the efficiency of the mechanical picker. Various devices for removing objectionable cotton foliage have been suggested. In one such device which has been successfully used in preparing the cotton plant for mechanical picking the plants are forced by means of an air blast against the revolving knives aligned at a vertical axis, which knives cut or trim the foliage from the plant while rejecting the cotton bolls ready for harvesting by a mechanical picker. While the use of this device materially increases the efficiency of the mechanical picking operation, only a part of the foliage is removed and the remaining portion interferes to some extent with the perfection of the cotton picking operation. Accordingly, a successful and dependable defoliating process which will eliminate substantially all the foliage without injuring the cotton or the plant is much to be desired.

In accordance with the present invention we now propose to subject the foliage of the cotton plant which is otherwise ready for picking for a short interval of time to heated air or gases at a temperature sufficient to wither or dry the leaves but insufficient to hurt or damage any open cotton or the plant itself. Such temperature should be substantially below the temperature of a direct flame and may be varied in accordance with the length of time that the plant is subjected to such temperature. The hot gases may be produced by burning suitable fuel and admixing the hot combustion gases in regulated quantity with cool air or gas. By regulating the relative quantity of the combustion gases and cool air or gases the temperature of the gases contacting the cotton plant may be regulated as desired.

It has been proposed to apply a flame or hot gases to weeds or grasses adjacent growing cotton plants while shielding the plants themselves from contact with such flame or hot gases. Our invention differs from this procedure in that gases of a temperature sufficient to shrivel the cotton foliage are applied directly to the foliage, but at a temperature insufficient to injure cotton fiber.

Our defoliating process is preferably performed by drawing one or more hoods to which gases are supplied lengthwise along one or more rows of cotton plants, which are gathered into the hood and into proximity to the hot gases by suitable gathering means at the forward end of the hood.

The invention will be more readily understood by reference to the accompanying drawings and the following detailed description, in which a specific embodiment of the invention is set forth by way of illustration rather than by way of limitation.

In the drawings:

Fig. 1 is a side elevation showing the defoliating attachment secured to the rear of a conventional tractor, the latter being shown only fragmentarily;

Fig. 2 is a top plan view of the same;

Fig. 3 is a sectional view on line 3—3 of Fig. 1 looking in the direction of the arrow, this view being on a larger scale than the two preceding views; and Fig. 4 is a detail view shown partly in longitudinal vertical section and partly in elevation showing a portion of the hot air conduit leading to the top of the heating drum and showing the burner feeding to the hot air conduit, together with the fuel feed pipe leading to the burner.

Referring generally to the drawings, A represents a suitable hood preferably mounted upon runners and adapted to be towed by a suitable tractor or the like.

Reference character B denotes a burner located at a suitable distance from the hood and adapted to supply hot combustion gases to a conduit entering in the top of the hood, which conduit may be supplied at its other end with air from a suitable fan generally designated by the reference letter C. By regulating the quantity of fuel admitted to the burner and/or the speed of the fan which supplies cool air the temperature of the gases admitted to the hood may be regulated as desired.

Referring more in detail to the hood A it will be noted that it is wide enough to enable one row of cotton to pass therethrough as the hood is drawn lengthwise thereover, and is of sufficient length to insure contact of the hot gases with the foliage of the plants as the hood passes thereover. The hood may be open at both ends and may be provided at its front end with suitable gathering guards 10 which serve to direct cotton plants into the hood. The hood may be mounted upon suitable runners 11 and may be provided with a U-shaped draw bar 12 of suitable construction detachably secured to a draw bar 13 extending rearwardly from the tractor 14 which may be of conventional type.

The rear ends of the draw bar 12 may be flexibly secured to the runners 11 by means of chains or the like 15.

As shown, a conduit for heated gases enters the top of the hood at 17 and extends upwardly and forwardly past the point 18 where the hot gases from the burner B enter the conduit and at a position above the burner B the conduit passes in a horizontal direction, as indicated at 19, and subsequently downwardly at 20 to an inlet portion 21 through which air is supplied to the fan C. Suitable framework 22 carried at the rear of the tractor 14 may be provided to support the down pipe 20 of the conduit and extensions 23 and 24 of the frame may be provided to carry a platform 25 upon which is mounted a suitable fuel tank 26 adapted to enclose any suitable type fuel, such as butane or propane. The tank may be provided with a pressure gauge 27 and as shown is provided with a valved outlet 28 which communicates through a conduit 29 with the burner B. The conduit 29 may be suitably supported by means of a brace 30 connected to the conduit through which air and gases are supplied to the hood A. Apertures 31 may be provided in the burner for the admission of air to support combustion of the fuel supplied from the tank 26.

The fan C may be mounted on a suitable shaft 40 shown as rotatably supported at its front end at the lower end of the frame member 23 and provided with a rear bearing 41 carried by the frame of the tractor. The fan shaft 40 may be driven through suitable gearing 42, 43 from any suitable source of power which may be the power plant of the tractor. Suitable means (not shown) may be provided for connecting or disconnecting the fan from its source of power, and if desired for regulating the speed of the fan.

In operation, air from the fan is passed upwardly through the vertical pipe 20, then through the horizontal pipe 19 and downwardly past the burner B to the entrance 17 to the hood A. The temperature of the mixed air and combustion gases entering the hood A may be regulated by controlling the quantity of fuel admitted to the burner B and/or by regulating the speed of the fan which supplies cold air to the fluid conduit.

Any suitable type of fuel may be employed, but butane or propane are considered as preferable. The heated air and combustion gases enter the hood through the top thereof with sufficient force to insure contact with all parts of the plants. The hood is preferably several feet long so that the machine may be moved along the row at a reasonable implement speed and still keep each plant subjected to hot air and combustion gases for a suitable time. The hood is designed to be pulled as a sled because this construction allows the runners to form a seal between the walls of the chamber and the ground. The hood is preferably towed but should be arranged on the power lift of the modern tractor to be raised for turning in a manner which will be fully understood without detailed description. While ordinarily a single hood will be towed by a single tractor it will be apparent that more than one hood may be employed where it is desired to defoliate more than one cotton row at a time.

The invention has been described in detail for the purpose of illustration but it will be obvious that numerous modifications and variations may be resorted to without departing from the spirit of the invention.

We claim:

1. An apparatus for continuously subjecting cotton plants in rows to hot gases of combustion comprising an elongated ground supported hood open at its ends for receiving the plants, means including a downwardly and rearwardly directed pipe entering the top of the hood adjacent the front end thereof for directing hot combustion gases below the temperature of flame to the plants while enclosed in the hood, means for moving the hood lengthwise along the rows, and means integral with the hood at the front end thereof for deflecting the plants into proximity to the hot gases within the hood.

2. An apparatus as set forth in claim 1 including means for regulating the temperature of the gases.

3. A device for subjecting cotton plants to hot gases below the temperature of flame, comprising an elongated hood open at front and rear to permit passage of the plants, means for detachably securing the hood to a vehicle, means including a single conduit for admitting hot gases to the top of the hood near the front end thereof, a burner communicating with said conduit at a point prior to the point of entry to the hood, fuel supply means for said burner, means regulating the supply of fuel to the burner, and means for admitting cool air to said conduit to dilute and cool the combustion gases prior to entry into the hood.

4. A device for subjecting cotton plants to hot gases below the temperature of flame, comprising an elongated runner supported hood open at front and rear to permit passage of plants therethrough, means detachably securing the same to a vehicle, flaring plant gathering guides integral with the sides of the hood at the front end thereof, means comprising a single conduit for admitting hot gases to the top of the hood near the front end thereof, a burner communicating with the conduit at a point prior to the point of entry to the hood, fuel supply means for said burner, means for regulating the supply of fuel to the burner, means for admitting cool air to said conduit to dilute and cool the combustion gases, and fan means for applying pressure to the hot gases entering the hood through the conduit.

5. A device for subjecting cotton plants to hot combustion gases, comprising an elongated ground supported hood, means for detachably securing the same to a vehicle, a conduit for admitting hot gases below the temperature of flame to the top of the hood near the forward end thereof, a burner communicating with said conduit at a point prior to the point of entry to the hood, liquid fuel supply means for said burner, means for regulating the supply of fuel to the burner, means for admitting cool air to said conduit to dilute and cool the combustion gases, and integral plant gathering guides at the forward end of the hood.

References Cited in the file of this patent

UNITED STATES PATENTS

| Number | Name | Date |
|---|---|---|
| 472,831 | Steel | Apr. 12, 1892 |
| 600,106 | White | Mar. 1, 1898 |
| 1,021,529 | Johnson | Mar. 26, 1912 |
| 1,021,530 | Johnson | Mar. 26, 1912 |
| 1,177,120 | Manners | Mar. 28, 1916 |
| 1,458,070 | Long | June 5, 1923 |
| 1,462,861 | Jordan | July 24, 1923 |
| 1,513,137 | Tarnok | Oct. 28, 1924 |
| 1,515,826 | Bohn | Nov. 18, 1924 |
| 1,567,969 | Marek | Dec. 29, 1925 |
| 1,584,254 | Tarnok | May 11, 1926 |
| 1,723,955 | Shepherd | Aug. 6, 1929 |
| 1,775,703 | Stokes | Sept. 16, 1930 |
| 2,288,569 | Mason | June 30, 1942 |
| 2,327,204 | McLemore | Aug. 17, 1943 |
| 2,408,328 | McLemore | Sept. 24, 1946 |
| 2,528,899 | McLemore | Nov. 7, 1950 |
| 2,531,741 | Peck | Nov. 28, 1950 |
| 2,531,884 | McLemore | Nov. 28, 1950 |